United States Patent [19]

Gerard

[11] 4,292,631

[45] Sep. 29, 1981

[54] PLASMA MATRIX DISPLAY UNIT

[76] Inventor: Guy Gerard, 1, cité du Colombier, Perros Guirec, France, 22700

[21] Appl. No.: 133,321

[22] Filed: Mar. 24, 1980

[30] Foreign Application Priority Data

Apr. 3, 1979 [FR] France ............................... 79 08393

[51] Int. Cl.³ ............................................... G06F 3/14

[52] U.S. Cl. .................................... 340/771; 313/190; 315/169.4

[58] Field of Search ............... 340/752, 766, 768, 769, 340/771; 315/169.4; 313/182, 188, 190, 197

[56] References Cited

U.S. PATENT DOCUMENTS

| | | | |
|---|---|---|---|
| 3,885,195 | 5/1975 | Amano | 340/769 |
| 4,047,169 | 9/1977 | Holz | 340/771 |
| 4,099,098 | 7/1978 | Cola | 340/771 |

*Primary Examiner*—Alvin H. Waring

*Attorney, Agent, or Firm*—Abraham A. Saffitz

[57] ABSTRACT

The plasma matrix display unit comprises a plurality of cathodes perpendicular to a scan anode and to at least one display anode in a gastight enclosure. All the cathodes are positioned on a rear plate. A front plate is transparent at least at the level of points aligned in parallel in the proximity of the display anode. In order to avoid fluctuations of distance between an anode and a cathode during heating operations, longitudinal insulating strips are disposed on the rear plate and form grooves therebetween. The grooves extend under the point lines of the front plate. Each anode is supported on an upper slot of an insulating strip and interacts electrically with the portion of the cathodes emerging from the adjacent groove. The cathodes, insulating strips and anodes are obtained by successive deposition and masking on the rear plate before any further heating. This display unit is designed particularly for the display of large-scale luminous patterns.

11 Claims, 4 Drawing Figures

PLASMA MATRIX DISPLAY UNIT

CROSS REFERENCE TO RELATED APPLICATIONS

Applicant hereby makes cross references to its French Patent Application PV 79 08393, filed Apr. 3, 1979 and claims priority thereunder following the provisions of 35 U.S.C. 119.

BACKGROUND OF THE INVENTION

1. Field of the Invention

The present invention relates to a plasma matrix display unit for presenting alphanumeric data and graphics.

2. Description of the Prior Art

More particularly, this invention concerns a plasma display unit or panel having an operation analogous to that of the writing head for a facsimile reproduction apparatus disclosed in U.S. Pat. No. 4,021,851. According to this Patent, the writing head for printing aligned points on a light sensitive surface is essentially formed by a tight enclosure which contains a low pressure rare gas. The enclosure is constituted by rear and front parallel rectangular insulating plates which are joined by a leak-tight seal at the periphery of the enclosure. The front plate is transparent. A first and second parallel metallic strips constitute the scan anode and the display anode and extends longitudinally on the internal surface of the front insulating plate. Third parallel metallic strips constitute the scan cathodes and the trigger cathode and extends orthogonally to and at a predetermined distance from the anodes on the rear insulating plate. The gastight enclosure also includes an insulating spacer which maintains the internal surface of both plate at the predetermined distance and which has a longitudinal slot therein. The width of the longitudinal slot is substantially equal to the entire width of the two anodes and contains these anodes. In fact, the slot constitutes the gastight enclosure. The display anode is perfored longitudinally of a plurality of equidistant aligned holes in front of which pass the scan cathodes.

According to the U.S. Pat. No. 4,021,851, the rear plate is generally of forsterite (natural silicate of magnesium) so that the insulating elements such as the insulating spacer are of an insulating compound suitable for high temperature serigraphy. During manufacture of a display unit of this type, the various heating operations deform the electrodes as a result of the contractions of the materials used. Consequently a display unit construction of this type cannot be used for a display matrix unit of large dimensions, as the deformations cause a variation of the predetermined distance along one anode. This does not enable PASCHEN minimum to be obtained with a great accurate between one anode and one cathode at the level of each point of the front plate, this being necessary for the desired localisation and accurate dimensions of a luminous spot which is obtained on the surface of a cathode by discharge of inert gas into the enclosure.

It is to be noted that this type of plasma display unit in which the control of the electrodes is a direct current and the display cells are each defined by the intersection of at least one display anode and a cathode, is described in a general manner in paragraph 4 of the article of G. F. Weston, in Journal of Physics E, scientific instruments, vol. 8, No. 12, December 1975, London. A particular display unit of this type, in which each cathode of a cell is in series with a load resistance printed on the second plate is also disclosed in the U.S. Pat. No. 3,718,483.

All the plasma display units according to this prior art have at least the second conducting strips, i.e. display anodes which are supported on the first plate, i.e. the upper front transparent plate, and the third conducting strips, i.e. cathodes which are supported on the second plate, i.e. the lower rear plate. They therefore have the above-mentioned drawbacks.

OBJECT OF THE INVENTION

The principal object of this invention is to provide a plasma matrix display unit in which the relative distances between anodes and cathodes are constant whatever the deformations which the first and second insulating plates may undergo during re-heating operations during manufacture.

SUMMARY OF THE INVENTION

According to the present invention, there is provided a plasma matrix display unit comprising:

a prismatic gastight enclosure containing a low pressure gas, said gastight enclosure being constituted by a first rectangular insulating plate which is transparent at least at the level of a plurality of uniformly spaced points aligned along a longitudinal line, by a second rectangular insulating plate and by a leak-tight sealing means defining the periphery of said enclosure and maintaining opposite the internal surfaces of said first and second plates, first, second and third insulating strips which are substantially parallelepipedic on the internal surface of said second plate and which are perpendicular to third metallic strips, said insulating strips forming two parallel longitudinal grooves therebetween, said second insulating strip extending longitudinally between said first and third insulating strips, each of said first and second insulating strips having a slot on the longitudinal edge facing to said third insulating layer and said groove between said second and third insulating strips being aligned with the longitudinal line of transparent points of said first plate, a first metallic strip and at least a second metallic strip extending parallely and longitudinally between said internal surfaces of said first and second plates, each of said first and second metallic strips having an external connection and being disposed at a predetermined distance from said internal surface of said second insulating plate in said slots, a plurality of third parallel metallic strips on said internal surface of said second plate extending orthogonally to and at said predetermined distance from said first and second metallic strips, each of said third metallic strips passing plumb with one of said points and having an external connection, means for successively applying between said external connection of said first or second metallic strip and said external connections of said third metallic strips a voltage causing a glow discharge which occurs between these strips and which emerges through the corresponding point when the voltage is applied to said second metallic strip, and means receiving a display data signal for controlling the switching of said first and second metallic strips in said voltage applying means dependent on the data signal amplitude.

The plasma display unit may advantageously be of large transverse and longitudinal dimensions, in which case it comprises a plurality of display anodes, i.e. second metallic strips. In addition, the fact that the anodes and the cathodes are superposed on the inner surface of the second insulating plate, independently of the construction of the first plate through the holes of which the image to be displayed is made visible, enables the serigraphy or the etching of any pattern on the inner surface of the first plate, i.e. the upper front plate.

The manufacture of the plasma matrix display unit embodying the invention is advantageously of low cost, on one hand as a result of the fact that the rear and front plates may be of ordinary glass and, on the other hand, as a result of the fact that the depositing of the insulating elements and the electrodes on the internal surface of the second plate is not subject to any intermediate heating.

BRIEF DESCRIPTION OF THE DRAWING

Other objects, features and advantages of this invention will become apparent from the following more particular description of a preferred embodiment of the invention as illustrated in the accompanying drawings, in which.

DESCRIPTION OF THE PREFERRED EMBODIMENT

Figure 1:
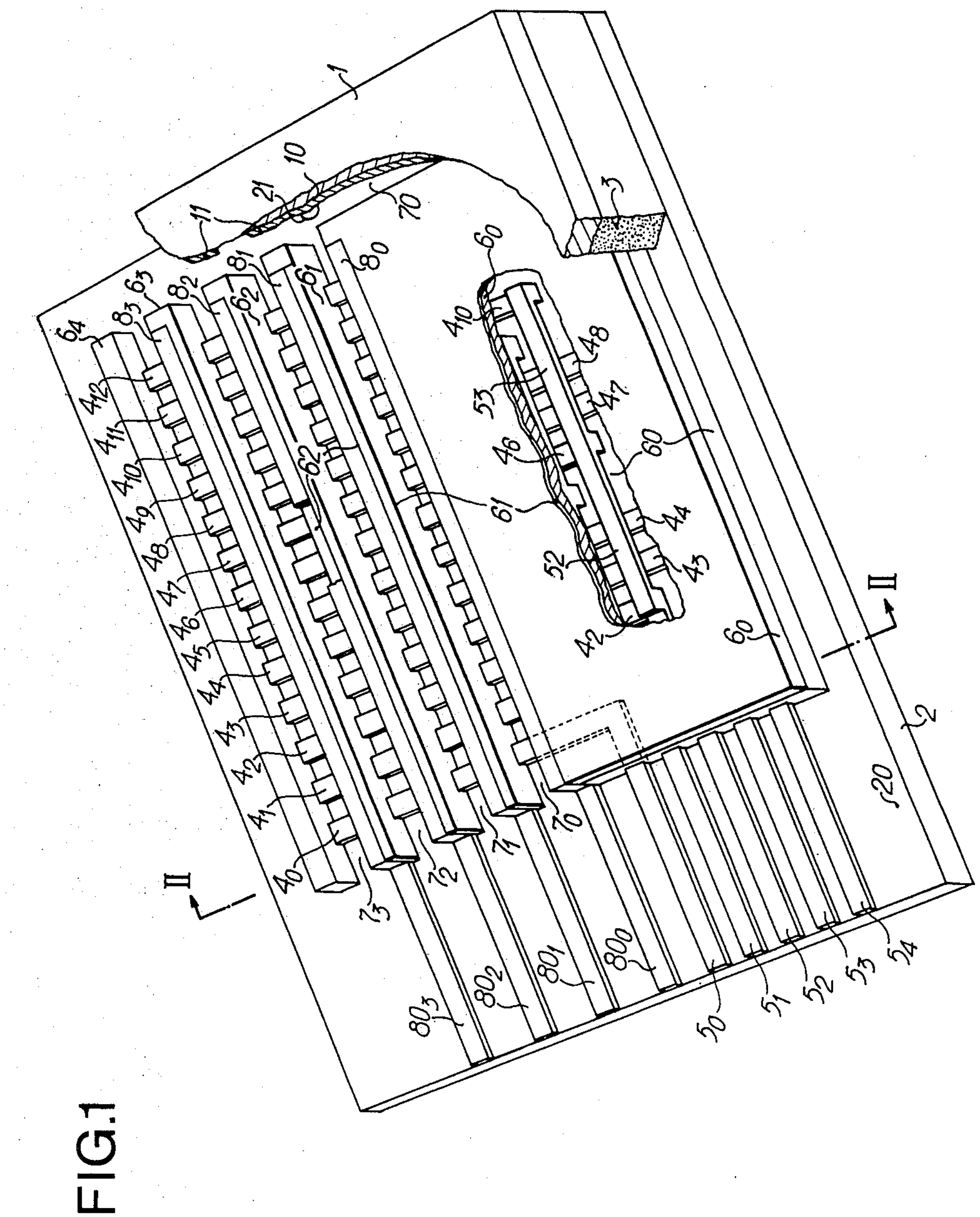
FIG. 1 is a structural perspective view which is partially in section and shows the electrodes on the second rear plate of the plasma display unit having three lines and twelve columns.
Figure 2:
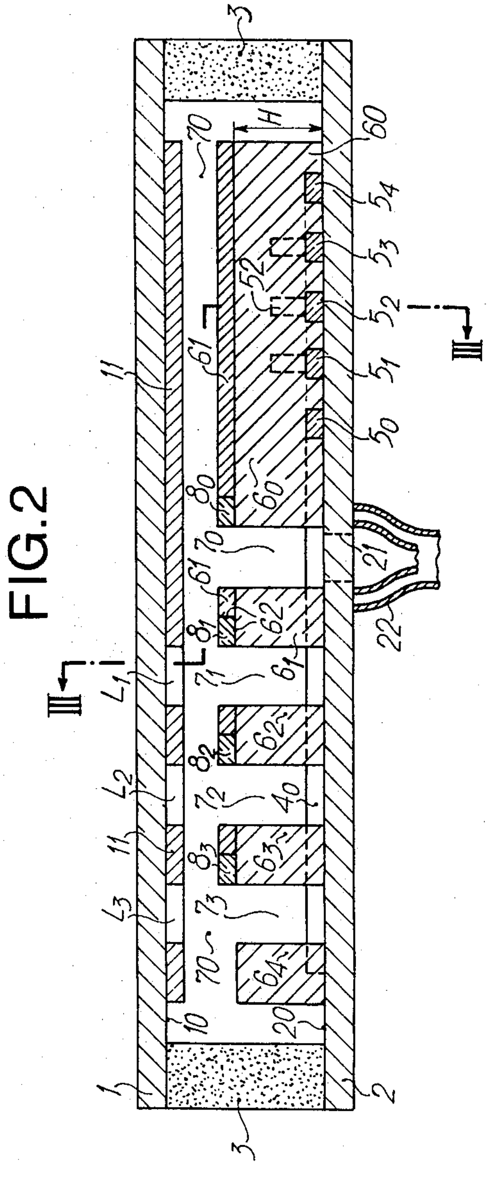
FIG. 2 is a transverse section along the line II—II of FIG. 1, in front of the trigger cathode.

As illustrated in FIGS. 1 and 2, a plasma display unit embodying the invention is essentially constituted by an upper (or rear) first insulating plate 1 and by a lower (or front) second insulating plate 2. These plates are rectangular and preferably of ordinary glass, such as window glass. Their inner surfaces are coated with an opaque coating, such as a vitreous opaque layer 10, 20 which reflects each glow produced within the enclosure of the display unit. The prismatic display unit enclosure is constructed in a leak-tight manner for the low pressure inert gas which it confines, by means of a leak-tight seal 3 surrounding the periphery of the first plate 1 which is smaller than that of the second plate 2 and maintains the two plates 1 and 2 in parallel.

Figure 4:
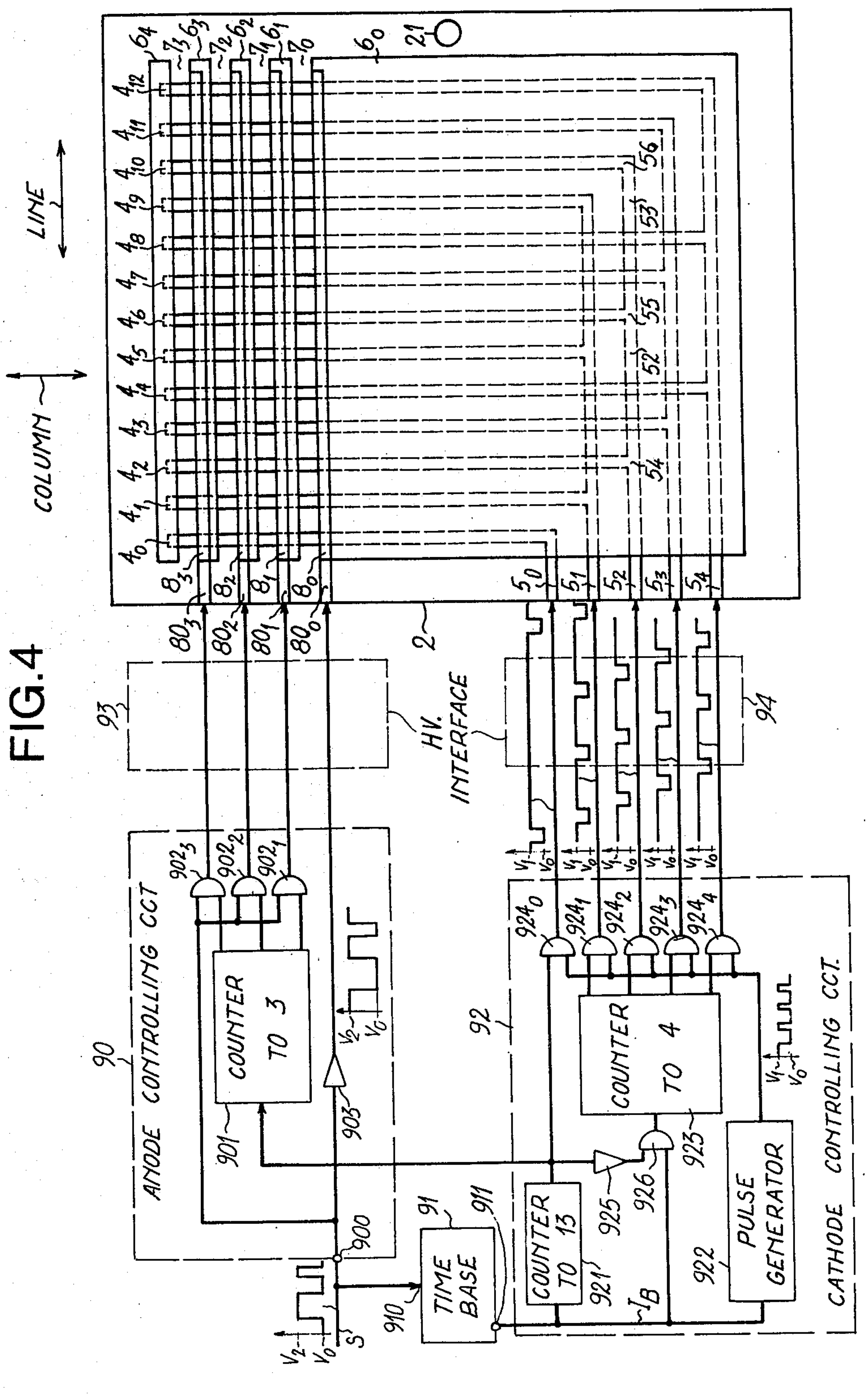
FIG. 4 is a block diagram of the electrode controlling means in conjunction with a top view of the plasma display unit shown to FIG. 1, with the first plate removed.

The second insulating plate 2 supports on its inner surface 20 a plurality of third metallic strips which are cathodes $4_1$, $4_2$, $4_3$ etc.. The cathodes are parallel, equidistant and transverse. These cathodes consist of a metallic deposit for example of nickel. As shown in FIGS. 1 and 4 in the case of a plasma display unit having 12 cathodes $4_1$ to $4_{12}$, the cathodes are connected four by four to external connection conductors $5_1$, $5_2$, $5_3$, $5_4$ which are arranged longitudinally and in parallel on the surface 20 of the second plate 2.

In FIGS. 1 and 4, the cathodes $4_1$, $4_5$ and $4_9$ are connected to the conductor $5_1$, the cathodes $4_2$, $4_6$ and $4_{10}$ are connected to the conductor $5_2$, the cathodes $4_3$, $4_7$ and $4_{11}$ are connected to the conductor $5_3$ and the cathodes $4_4$, $4_8$ and $4_{12}$ are connected to the conductor $5_4$. This interconnection is similar to that disclosed in the above-mentioned U.S. Pat. No. 4,021,851 and is possible, as is known, by the fact that the longitudinal diffusion which is perpendicular to the cathodes, of the electrical field between an electrically excited cathode such as $4_1$ and an anode of the display unit may not extend to the subsequent cathode such as $4_5$.

Figure 3:
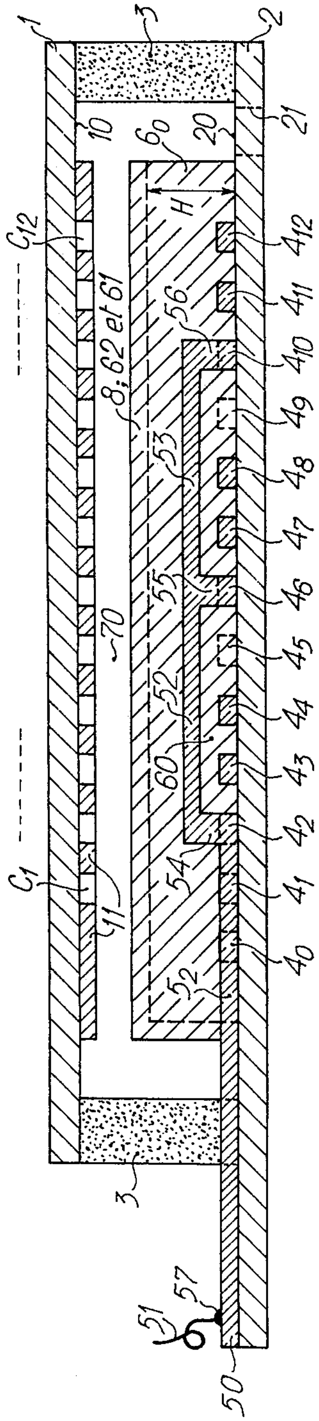
FIG. 3 is a longitudinal section along the broken line III—III of FIG. 2, along a cathode connection conductor and the first line of points of the first front plate.

The intersections between the cathodes 4 and the connection conductors 5 are obtained by means of a plurality of connection bridges which overlap the cathodes on insulating bridges. In accordance with the illustrated embodiment, in which all the connection conductors 5 are grouped on a same longitudinal side of the inner surface 20 of the second plate 2, a connection conductor such as $5_2$, shown in detail in FIG. 3, is constitued by an end section 50 which is disposed at the same time as the cathodes $4_1$ to $4_{12}$ on the inner surface 20 of the second plate 2. The greater portion of the section 50 is located inside the gastight enclosure. The external portion of the section 50 is connected to a control wire 51, for example by welding and silver contact deposit or by means of a female connecting rod which fits onto the corresponding lateral edge of the plate 2 and acts as a plug. The connection conductor $5_2$ also comprises two conducting bridges 52 and 53 which are preferably on a common implantation plane between that of the inner surface 20 of the plate 2 and that of the anodes of the plasma display unit. In order to obtain these conducting bridges, masking and depositing of an insulating sub-layer 60 is carried out. The sub-layer 60 covers the ends of all the cathodes $4_0$ to $4_{12}$, with the exception of the ends of the bridges such as 52, 53 so as to form wells such as 54, 55, 56. The metallic deposit forming the connection bridges is then carried out. The bridge 52 of the conductor $5_2$ perpendicularly overlaps the ends of the cathodes $4_3$ and $4_4$, and the bridge 53 of the conductor $5_2$ perpendicularly overlaps the ends of the cathodes $4_7$ and $4_8$ by means of the insulating sub-layer 60. The conducting wells 54, 55 and 56 are plumb with the ends of the cathodes $4_2$, $4_6$ and $4_{10}$. It can be seen from the arrangement of the cathodes and connection conductors shown in FIG. 4 that the conductor $5_1$ comprises two connection bridges each overlapping three cathodes $4_2$, $4_3$, $4_4$ or $4_6$, $4_7$, $4_8$, that the conductor $5_3$ comprises two connection bridges each overllapping one cathode $4_4$ or $4_8$ and that the conductor $5_4$ does not comprise any connection bridges and is entirely coplanar to the surface 20 of the second plate 2.

In addition to the cathodes $4_1$ to $4_{12}$, there is also a triggering cathode $4_0$ which is supported on the inner surface 20 of the second plate 2. The cathode $4_0$ is disposed transversely and parallel to the other cathodes $4_1$ to $4_{12}$ and is electrically separate from the latter. The cathode $4_0$ is connected to an external connection conductor $5_0$ which is parallel to and coplanar with the external connection conductors $5_1$ to $5_4$. The cathode $4_0$ is designed to trigger the glow discharge along the longitudinal lines of points $L_1$ to $L_3$, respectively.

As shown in FIGS. 1 and 2, a plurality of parallel insulating layers, for example five, $6_0$ to $6_4$, are supported on the inner surface 20 of the second plate 2. Each insulating layer has the shape of a elongated longitudinally parallelepipedic strip and is perpendicular to the cathodes $4_0$ to $4_{12}$.

The first insulating strip $6_0$ is much larger than the others in order to cover within the enclosure the interconnections between the ends of the cathodes $4_0$ to $4_5$ and the connection conductors $5_0$ to $5_5$, as in particular their connection bridges. The second insulating strips $6_1$ to $6_3$ lain between the end strips $6_0$ and $6_4$, and the third insulating strip $6_4$ at the transverse end opposite to the first strip $6_0$ are small in width and form therebetween longitudinal grooves $7_0$ to $7_3$ which have identical widths. As shown in FIGS. 1 and 2, a portion of each cathode $4_0$ to $4_{12}$ appears in the bottom of the grooves. All the insulating strips $6_0$ to $6_4$ are formed simultaneously by masking and depositing a black crystallisable dielectric paste to a predetermined height H above the surface 20 of the second plate 2. This paste shaping the insulating strip $6_0$ also covers the insulating sub-layer 60 which insulates the interconnections between connection bridges and cathodes.

The first and second insulating strips $6_0$ to $6_3$ support first and second metallic strips which are longitudinal and parallel anodes $8_0$ to $8_3$, respectively. Each anode is obtained by a metallic deposit, such as nickel, on the longitudinal surface of the insulating support, which is adjacent to its vertical edge face to the end strip $6_4$. These anodic metallic deposits are extended towards the exterior of the gastight enclosure so as to form external connection conductors $80_0$ to $80_3$ which are parallel to the external connection conductors $5_0$ to $5_4$ of the cathodes, as shown in FIGS. 1 and 4. Therefore the anodes $8_0$ to $8_3$ are adjacent to the grooves $7_0$ to $7_3$, respectively and cooperate electrically with the portions of the cathodes $4_0$ to $4_{12}$ which are included in the bottom of these grooves, respectively. The predetermined distance H between one anode 8 and one cathode portion 4 in a common groove 7 is as close as possible to PASCHEN minimum so as to localise, as is known, a glow discharge or a luminous spot on the surface of the cathode portion when a suitable voltage is applied between the anode and the cathode and when a low pressure gas, such as neon, fills the enclosure of the display unit. This glow discharge causes a cathodic light spot which is well defined in terms of position, dimensions and intensity. It is to be noted in this respect that, in contrast to known plasma display units, the critical distance H is obtained with a high degree of precision and remains constant during subsequent heating operations after the depositing operations, whatever the deformations or defects in planeity possibly due to the re-heating or annealing, as a result of the fact that the anodes are rigid with the cathodes by means of the crystallisable dielectric plate insulating strips $6_0$ to $6_3$ whose height does not fluctuate during annealing. In addition, as a result of the fact that each anode is supported over its entire length by an insulating strip $6_0$ to $6_3$, the height H is constant from one end to the other of the anode in respect of the surface 20 of the second plate 2. This enables the production of plasma display units of large dimensions.

Reporting to FIGS. 1 and 2, the insulating strips $6_0$ to $6_3$ are then covered by an insulating sub-layer 61 which has a thickness equal to or substantially higher than the conductor strips constituting the anodes $8_0$ to $8_3$. It appears that the insulating strips $6_0$ to $6_3$ have a parallelepipedic shape and have a slot 62 facing the end insulating strip $6_4$ which does not support an anode. Each display anode $8_1$ to $8_3$ (second metallic strip) is included in a slot 62 of the strips $6_1$ to $6_3$ and does not directly face the cathode portions $4_0$ to $4_{12}$ which precede it in the groove $7_0$ to $7_2$, respectively and cannot therefore interact electrically with the cathode portions.

The inner surface 10 of the first plate 1 comprises a matrix of longitudinal lines $L_1$ to $L_3$ and transverse columns $C_1$ to $C_{12}$ of holes through each of which the glow discharges created by the voltage control of the respective display anode $8_1$ to $8_3$ produce a luminous spot. In the first insulating plate 1, these holes are equidistributed longitudinally above the longitudinal median axes of the longitudinal grooves $7_1$ to $7_4$ and transversally above the longitudinal median axes of the transverse cathodes $4_1$ to $4_{12}$. A plane gap 70 of a small thickness extends in the enclosure between the plate 1 and the insulating strips $6_0$ to $6_4$ of the second plate 2 and parallel with these and enables the connection between the grooves $7_0$ and $7_3$ for the purposes of the pre-ionisation along the columns $C_1$ to $C_{12}$. According to the illustrated example, the plasma display unit comprises a matrix of $3\times 12$ holes.

The holes may be obtained by disposing a vitreous layer 11 on the inner surface 10 of the first plate 1, the holes being cut in this layer either by masking of the locations of the holes by means of a masking grid and disposing a vitreous layer 11 on the exterior of the holes. It is to be noted that the assembly of insulating strips $6_0$ and $6_1$ and the groove $7_0$ is the site of the glow discharges due to the scan anode (first metallic strip) and is located below a single vitreous layer 11, so that the glow discharges due to scanning are not visible.

To complete the construction of the display unit, the second plate 2 is drilled with a hole 21 providing access to the gastight enclosure so as to seal a double glass tube 22 at this point on the external surface of the plate 2. This glass tube is designed for the passage of a small quantity of mercury before pumping and filling of the gastight enclosure with inert gas and before its closure. The purpose of the mercury is to reduce the rate of cathodic sputtering under the action of the ionic bombardment caused by a glow discharge.

With reference now to FIG. 4, the control of the electrodes of the plasma display unit is obtained by means of an anode controlling circuit 90, a time base 91 and a cathode controlling circuit 92. The inputs 900 of the circuit 90 and the input 910 of the time base 91 receive the pulse signal S which convoies the image to be displayed by the display unit. The signal S is a pulse signal having predetermined limit voltages $V_0$ and $V_2$. Their difference $(V_2-V_0)$ is equal to that required to ignite a glow discharge in a cell of a display unit. A cell is defined by the intersection of a cathode and an anode whose respective voltages are equal to $V_0$ and $V_2$, for example 0 volt and 250 volts. The time base 91 is synchronised on the signal S by means of a suitable phase locking loop and produces at its output scan pulses $I_B$. The frequency of the scan pulses $I_B$ is equal to that of the glow discharges ignited successively from cathode to cathode longitudinally in the second plate 2.

The cathode controlling circuit 92 comprises a counter 921 counting to thirteen for energizing the trigger cathode $4_0$, a pulse generator 922 for successively energizing the cathodes to a predetermined voltage $V_1$ and a counter 923 to 4 for successively energizing the four groups of three cathodes which are connected to the external connection conductors $5_1$ to $5_4$, respectively. The generator 922 produces in synchronisation with the scan pulses transmitted by the output 911 of the time base 91, pulses which have limit voltages comprised between $V_1$ and $V_0$. The positive voltage $V_1$ lies between $V_2$ and $V_0$ and has a value, for example 80 volts, such that the potential difference $V_2-V_1$ applied between an anode and a cathode does not enable a glow discharge to be produced in the intersection cell of these two electrodes. The counter 921 counts the scan pulses $I_B$ cyclically up to 13 in such a way that its output resets the trigger cathode $\mathbf{4}_0$ to the voltage $V_0$ across an analog AND-gate $\mathbf{924}_0$. The counter input of the counter 923 is connected to the output of the counter 921 across an inverter 925 and an AND-gate 926 whose other input receives the scan pulses $I_B$. The counter 923 counts the pulses $I_B$ cyclically up to 4 between two pulses transmitted by the counter 921 so as to cyclically control the setting to the voltage $V_0$ of the four groups of three cathodes each $\mathbf{4}_1$ to $\mathbf{4}_{12}$. In order to do this, the four outputs of the counter 923 control the opening of four analog AND-gates $\mathbf{924}_1$ to $\mathbf{924}_4$ whose outputs are connected to the connection conductors $\mathbf{5}_1$ to $\mathbf{5}_4$ of the cathode groups across a high voltage transistor interface 94. The other inputs of the AND-gates $\mathbf{924}_0$ to $\mathbf{924}_4$ are connected to the output of the pulse generator 922. Thus, each time that an AND-gate 924 is open, the cathode(s) connected to the output of this gate are brought momentarily to the voltage $V_0=0$ volt whilst the other cathodes are brought to the non-trigger voltage $V_1=80$ volts.

The anode controlling circuit 90 comprises a counter 901 counting to 3, three analog AND-gates $\mathbf{902}_1$ to $\mathbf{902}_3$ and an analog inverter 903. One of the inputs of the gates $\mathbf{902}_1$ to $\mathbf{902}_3$ and the input of the inverter 903 receive the signal S. The other control inputs of the AND-gates $\mathbf{902}_1$ to $\mathbf{902}_3$ are connected to the outputs of the counter 901 whose counting input is connected to the output of the counter 921 of the cathode controlling circuit 92. The output of the analog inverter 903 is connected to the connection conductor $\mathbf{80}_0$ of the scan anode $\mathbf{8}_0$. The outputs of the gates $\mathbf{902}_1$ to $\mathbf{902}_3$ are connected to the connection conductors $\mathbf{80}_1$ to $\mathbf{80}_3$ of the display anodes $\mathbf{8}_1$ to $\mathbf{8}_3$. In fact, the outputs of the inverter 903 and the AND-gates $\mathbf{902}_1$ to $\mathbf{902}_3$ are connected to the external connection conductors $\mathbf{80}_0$ to $\mathbf{80}_3$ via a high voltage transistor interface 93, respectively.

Each time the counter 921 brings the trigger cathode $\mathbf{4}_0$ to the voltage $V_0$, the counter 901 advances one unity until reaching three, then returns automatically to zero. Each unity advance maintains the opening of an AND-gate $\mathbf{902}_1$ to $\mathbf{902}_3$ during twelve consecutive scan pulses. The triggering of the ignition of cells of a line at the beginning of one advance of the counter 901 corresponds to the etablishment of a glow discharge on the column which is aligned with the trigger cathode $\mathbf{4}_0$ and to the pre-ionisation of the cells of the following column $C_1$ aligned with the first cathode $\mathbf{4}_1$. This glow discharge on a portion of the cathode $\mathbf{4}_0$ takes place in one of the cells of the grooves $\mathbf{7}_1$ to $\mathbf{7}_3$ if the signal S is at a voltage value $V_2=250$ volts. For example if the counter 901 has counted to 2, the portion of the cathode $\mathbf{4}_0$ in the grove $\mathbf{7}_2$ is the site of a light pulse. On the other hand, if the signal S is at the level $V_0=0$ volts, all the anodes $\mathbf{8}_1$ to $\mathbf{8}_3$ are at $V_O$ and the scan anode $\mathbf{8}_0$ is at the voltage $V_2=250$ volts by means of the voltage inversion produced in the inverter 903, which causes a glow discharge on the portion of the trigger cathode $\mathbf{4}_0$ in the groove $\mathbf{7}_0$. This first discharge enables the preionisation of the following adjacent cells which are aligned with the cathode $\mathbf{4}_1$. If the following discharge takes place on one of the portions of the cathode $\mathbf{4}_1$ included in one of the grooves $\mathbf{7}_1$ to $\mathbf{7}_3$, a luminous spot is visible through the corresponding hole of the line $L_1$ to $L_3$. In contrast, any discharge produced in the groove $\mathbf{7}_0$ contiguous with the scan anode $\mathbf{8}_0$ does not produce any luminous spot as a result of the coating with the insulating layer 11. A discharge of this type only enables the pre-ionisation of the cells which are aligned with the subsequent cathode.

It is to be noted that the principle of scanning, ionisation and pre-ionisation for each line $L_1$ to $L_3$ is similar to that described in the U.S. Pat. No. 4,021,851 and that, in addition, in accordance with the invention, the display of the luminous spots may be obtained on a plurality of lines. I have constructed a plasma display unit of this type which comprises 16 display anodes, and operates normally although the distance between the scan anode and the final display anode is comparatively large. In accordance with other variants, so as to remedy certain pre-ionisation problems, the scan anode may be placed centrally in the coplanar distribution of the display anodes. For example in the case of a display unit having eight display anodes, the scan anode is disposed between two groups of four display anodes. Of course, the groove such as $\mathbf{7}_0$ which is the site of the scan glow discharge is completely below an opaque insulating layer such as 11, as shown in FIG. 2.

To produce the plasma matrix display unit embodying the invention, the following method may be followed.

Two plates 1 and 2 of ordinary glass are used, thus enabling the use of materials which are compatible with the temperatures involved during operation and which provide a low manufacturing cost.

The first and second plates are cut to the required dimensions, the surface of the first plate 1 being smaller than that of the second plate 2. The second plate is drilled with a hole 21 suitable for the external application of the glass tube 22. After ultra-sonic cleaning with trichloroethylene, rinsing with alcohol and drying of the surfaces of the plates 1 and 2, a vitreous film is possibly deposited on the inner surfaces 10 and 20 in order to prevent a loss of luminosity at least through the second plate 2.

The constituents are then prepared on the inner surface 20 of the second plate 2. The networks of cathodes 4 and external connection conductors 5 and 80 are obtained by masking and depositing nickel on the surface 20. This enables the obtention of a pumping effect of the binding agents by the vitreous film previously deposited and a better definition of the edges of the columns. The second plate is then dried for 10 minutes at 120° C. A drying of this type is carried out after each of the four subsequent depositing operations. Second maskings and the deposition of a dielectric paste of a thickness of 0.2 mm form the insulating bridges 60 between the connection conductors 5 and the cathodes 4 and the insulating strips 6. The connection bridges, such as 51 and 53 shown in FIGS. 3 and 4, and the anodes are then obtained by nickel deposits. External supply contacts of silver paste, such as 57 shown in FIG. 3, at the ends of the external connection conductors 5 and 80 are produced by fourth masking and depositing. A crystallizable dielectric insulating paste is deposited finally on all the non-utilized portions and forms the final insulating strips 6. The second plate 2 obtained in this way is ready to be heated. In this respect, it is to be noted at this stage, that the anode and cathode networks have not been subjected to any heating. This provides an appreciable reduction in manufacturing time and eliminates any risks of oxydation of the nickel since the latter has not been subjected to a plurality of heating operations.

The heating cycle of the second plate 2 supporting the cathodes and anodes is preferably as follows:

constant temperature increase to 325° C. for approximately 16 minutes;

holding at 325° C. for approximately 10 minutes for the burning of the binding agents;

further constant temperature increase to approximately 575° C., at a rate of approximately 20° C./minute;

second temperature hold for approximately 10 minutes;

withdrawal for approximately 10 minutes of the second plate from the heating furnace in a balanced way, more rapidly at the beginning than at the end so as to prevent the formation of thermal shocks.

In addition, the first plate 1 is also subjected on its internal surface to the depositing of an insulating dielectric paste 11, and to a simultaneous masking or etching to form the holes corresponding to the points of the matrix of the display unit. It is also subjected to a heating operation identical to that described above.

The first and second plates being heated in this way, they are finally sealed. In order to carry this out a layer of epoxy resin is deposited three times in succession on each of the internal surfaces 10, 20 of the two plates 1 and 2, at the place provided for the seal 3, each depositing operation being followed by re-heating or annealing at approximately 100° C. for 20 minutes. Before the third depositing operation mentioned above, the anodes and conductors visible on the surface 20 of the second plate 2 are polished with very finely damping powder so as to eliminate any traces of oxydation. The epoxy resin used is composed of a hardening agent and a support material and enables serigraphy and polymerisation at 100° C. for 20 minutes. It does not degasify and has a good resistance to vacuum.

The two plates are then assembled by sticking the resin layer surfaces together. The double glass tube 22 has its base stuck to the external surface of the second plate, coaxially to the hole 21, by resin needle coating. After mounting the glass tube 22 on a pumping framework so as to introduce a rare gas under low pressure such as neon, argon or krypton, and finally closure of the glass tube 22 the display unit is ready for use.

What I claim is:

1. A plasma matrix display unit comprising:

a prismatic gastight enclosure containing a low pressure gas, said gastight enclosure being constituted by a first rectangualr insulating plate which is transparent at least at the level of a plurality of uniformly spaced points aligned along a longitudinal line, by a second rectangular insulating plate and by a leak-tight sealing means defining the periphery of said enclosure and maintaining opposite the internal surfaces of said first and second plates, first, second and third insulating strips which are substantially parallelepipedic on the internal surface of said second plate and which are perpendicualr to third metallic strips, said insulating strips forming two parallel longitudinal grooves therebetween, said second insulating strip extending longitudinally between said first and third insulating strips, each of said first and second insulating strips having a slot on the longitudinal edge facing to said third insulating layer and said groove between said second and third insulating strips being aligned with the longitudinal line of transparent points of said first plate, a first metallic strip and at least a second metallic strip extending parallely and longitudinally between said internal surfaces of said first and second plates, each of said first and second metallic strips having an external connection and being disposed at a predetermined distance from said internal surface of said second insulating plate in said slots, a plurality of third parallel metallic strips on said internal surface of said second plate extending orthogonally to and at said predetermined distance from said first and second metallic strips, each of said third metallic strips passing plumb with one of said points and having an external connection, means for succssively applying between said external connection of said first or second metallic strip and said external connections of said third metallic strips a voltage causing a glow discharge which occurs between these strips and which emerges through the corresponding point when the voltage is applied to said second metallic strip, and means receiving a display data signal for controlling the switching of said first and second metallic strips in said voltage applying means dependent on the data signal amplitude.

2. A plasma matrix display unit as claimed in claim 1, comprising a plurality of second metallic longitudinal strips supported respectively by the slots of a plurality of second insulating strips which extend parallelly between said first and third insulating strips on said internal surface of said second plate and which form between each other parallel grooves aligned respectively with a plurality of longitudinal lines of transparent points of said first insulating plate (1), said controlling means (901) successively controlling the switching of said second metallic strips.

3. A plasma matrix display unit as claimed in claim 1, wherein said first insulating strip covers the portions of said third metallic strips adjacent to their external connections and form insulating bridges between the ends of said third metallic strips and their external connections.

4. A plasma matrix display unit as claimed in claim 1, comprising first, second and third vitreous layers which extend on said internal surface of said first insulating plate at least facing said first, second and third insulating strips of said second insulating plate, the spaces between said vitreous layers defining said plurality of said transparent points.

5. A plasma matrix display unit as claimed in claim 1, wherein said internal surface of said first insulating plate is covered by a vitreous layer in which said plurality of said transparent points is cut.

6. A plasma matrix display unit as claimed in claim 1, wherein said first and second insulating plates are of ordinary glass and are covered at least partially on their internal surfaces by an opaque layer.

7. A plasma matrix display unit as claimed in claim 1, wherein said insulating strips, said metallic strips and said external connections are obtained by depositing and masking successively on said internal surface of said second plate without intermediate heating operations.

8. A plasma matrix display unit as claimed in claim 7, wherein said metallic strips and said external connections are of nickel.

9. A plasma matrix display unit as claimed in claim 1, for which the heating of said insulating plates is obtained by a constant temperature increase to 325° C. for approximately 16 minutes, followed by a temperature hold at 325° C. for approximately 10minutes, then by a further temperature increase to approximately 575° C. at a rate of approximately 20° C./minute, followed by a second temperature hold for approximately 10 minutes and a balanced withdrawal of said insulating plates from the heating oven for approxiamtely 10 minutes.

10. A plasma matrix display unit as claimed in claim 1 wherein said sealing means of epoxy resin.

11. A plasma matrix display unit as claimed in claim 10, for which said sealing means is achieved on said internal surfaces (10, 20) of said first and second insulating plates by successive depositions of a dielectric paste each followed by heating to approximately 100° C. and then by sticking the surfaces of said dielectric paste deposits.

* * * * *